R. BARBER, Jr.
PROCESS OF TUBULATING GLASS BOTTLES, RETORTS, AND THE LIKE.
APPLICATION FILED JAN. 13, 1917.
1,230,368. Patented June 19, 1917.
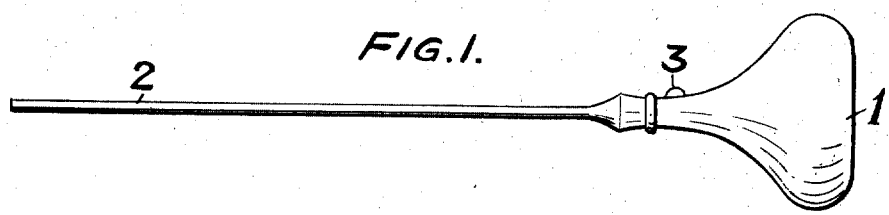
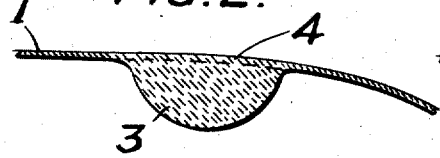
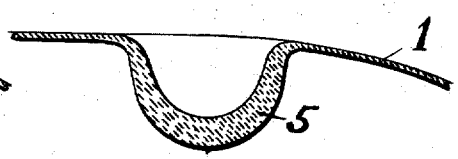
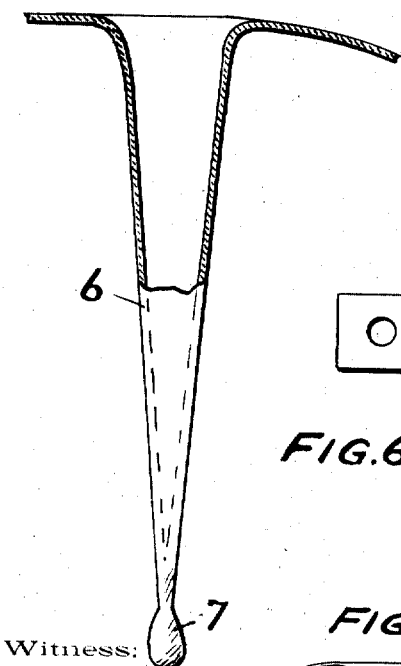
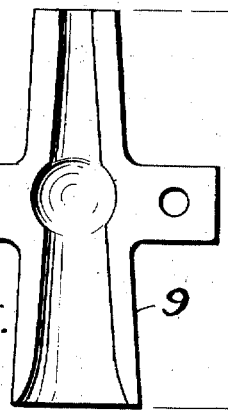
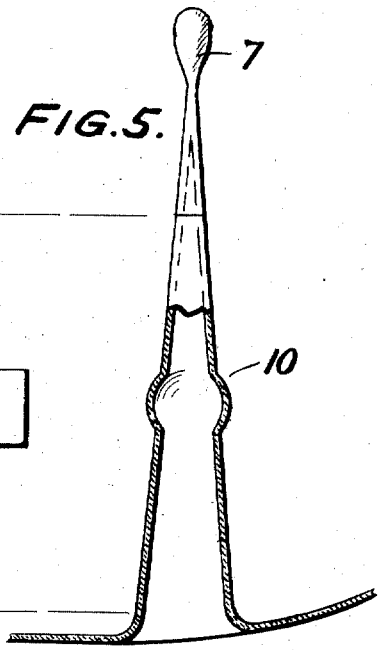
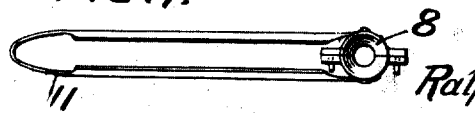
Witness: Rob. R. Kitchel.
Inventor: Ralph Barber, Jr.
By Augustus B Stoughton
Attorney.

UNITED STATES PATENT OFFICE.

RALPH BARBER, JR., OF MILLVILLE, NEW JERSEY, ASSIGNOR TO VICTOR DURAND, JR., OF VINELAND, NEW JERSEY, TRADING AS VINELAND FLINT GLASS WORKS.

PROCESS OF TUBULATING GLASS BOTTLES, RETORTS, AND THE LIKE.

1,230,368.       Specification of Letters Patent.       Patented June 19, 1917.

Application filed January 13, 1917. Serial No. 142,198.

*To all whom it may concern:*

Be it known that I, RALPH BARBER, Jr., a citizen of the United States, and a resident of Millville, in the county of Cumberland and State of New Jersey, have invented a certain new and useful Process of Tubulating Glass Bottles, Retorts, and the like, of which the following is a specification.

The principal objects of the present invention are, first to reduce the cost and simplify the operation of making tubulatures, side-necks, extra-necks, hose-connections, screw-necks and the like on glass bottles, retorts, jars and hollow glass articles generally, such for example as are used in chemical and physical laboratories and in other places; and second, to produce such tubulatures and the like of practically any shape and of great uniformity.

To these and other ends hereinafter stated the invention comprises the process of tubulating hollow glass articles which consists in applying a drop of molten glass to the wall of the article while hot from its initial heat to locate the tubulature and soften the underlying glass, blowing both applied and softened glass into a hollow projection, applying a mold to the projection while still hot from its initial heat, and blowing the projection into the mold to shape the tubulature, substantially as will be hereinafter described.

The process will be described in connection with the accompanying drawings which are intended for use in explaining it and not for the purpose of confining it to the steps illustrated or to the particular tubulatures shown.

In those drawings, Figure 1 is a side elevational view.

Figs. 2, 3, and 4 are diagrammatic views principally in section illustrating steps of the process.

Fig. 5, is a view principally in section illustrating what may be called the finished product, and Figs. 6 and 7 are a detail and a top view of apparatus useful in the practice of the invention.

The article 1 having been blown, as by means of the blow-pipe 2, and while hot, has applied to it a drop of molten glass 3. The place where the molten glass is dropped on the article determines the location and size of the tubulature and the heat of the molten glass 3 softens the glass of the underlying portion 4 of the wall of the article. Continued blowing results in the formation of a hollow projection 5 consisting of both the applied glass 3 and the underlying glass 4. This projection 5, if desired, may be formed by stretching as well as blowing so as to assume, for example, the form indicated at 6. The stretching can be accomplished by taking hold of the projection as at 7, by means of a suitable instrument, and if desired the end beyond 7 may be cut off. It is desirable to form the projection or extension 6 in depending position since its walls are quite soft. The projection is then turned upward and the mold 8, of which one section 9 is shown in Fig. 6, is quickly applied to it while it is still hot from its initial heat and by continuing the blowing operation the projection is shaped as at 10 to conform to the mold so that the tubulature is completed. Afterward the article is annealed and the end portion 7 is removed and the edge of the end properly finished.

The tool illustrated in Figs. 6 and 7 forms the subject-matter of my application serially numbered 142,197, filed Jan. 13, 1917, and for the purposes of this application it will be sufficient to say that it consists of two sections 9 mounted on the ends of a spring-handle 11, which normally holds the two sections apart so that they can be quickly applied over the end of the projection.

For the sake of description it may be said that the finished and shaped tubulature may be of substantially any shape as it is evident that the mold can be made to produce substantially any shape, although as shown it is intended to produce a spherical enlargement well adapted to constitute a hose connection. However, two such enlargements may be produced, or a screw-thread may be produced, all of which will be obvious to those skilled in the art.

Inasmuch as the finished tubulature of any required shape is produced and shaped as a continuation of the process of blowing the article and making the extension 5, it follows that the manufacture is rapid and inexpensive while at the same time tubulatures may be shaped so as to be practically uniform. The advantage of the described process comparison with the old process by which the article in substantially the condition shown in Fig. 4 was annealed and thereafter heated annularly so as to soften it and re-connected up so that a part like 10 could be produced by blowing and manipulating, is too obvious to those skilled in the art to require further explanation, for by the old practice projections like 10 could only be formed by skilled labor in what is usually known as the lamp department of the works and even then the product lacked uniformity.

The invention is not limited to the making and shaping of one tubulature on the article, for it is evident that more than one can be made in the manner described.

What I claim is:

1. In the process of tubulating hollow glass articles by dropping molten glass on the wall of the article while hot from its initial heat to locate the tubulature and soften the underlying glass and by blowing both the applied and softened glass into a hollow projection by the application of air pressure from within the article, the improvement which consists in applying a mold to the hollow projection while it retains its initial heat, and converting the projection into a tubulature by shaping it in the mold by a continuation of the application of air pressure from within the article.

2. In the process of tubulating hollow glass articles by dropping molten glass on the wall of the article while hot from its initial heat to locate the tubulature and soften the underlying glass and by blowing both the applied and softened glass into a hollow projection by the application of air pressure from within the article, the improvement which consists in preparing the projection by elongating it, applying a mold to the prepared hollow projection while it retains its initial heat, and converting the projection into a tubulature by shaping it in the mold by a continuation of the application of air pressure from within the article.

RALPH BARBER, Jr.